3,838,012
MULTIPOINT TEST PAPER
Calvin E. Higgens and Wilbur L. Martin, Jr., Indianapolis, Ind., assignors to Eli Lilly and Company, Indianapolis, Ind.
Filed Nov. 20, 1972, Ser. No. 308,077
Int. Cl. C12k 1/10; G01n 31/00
U.S. Cl. 195—127                                                    7 Claims

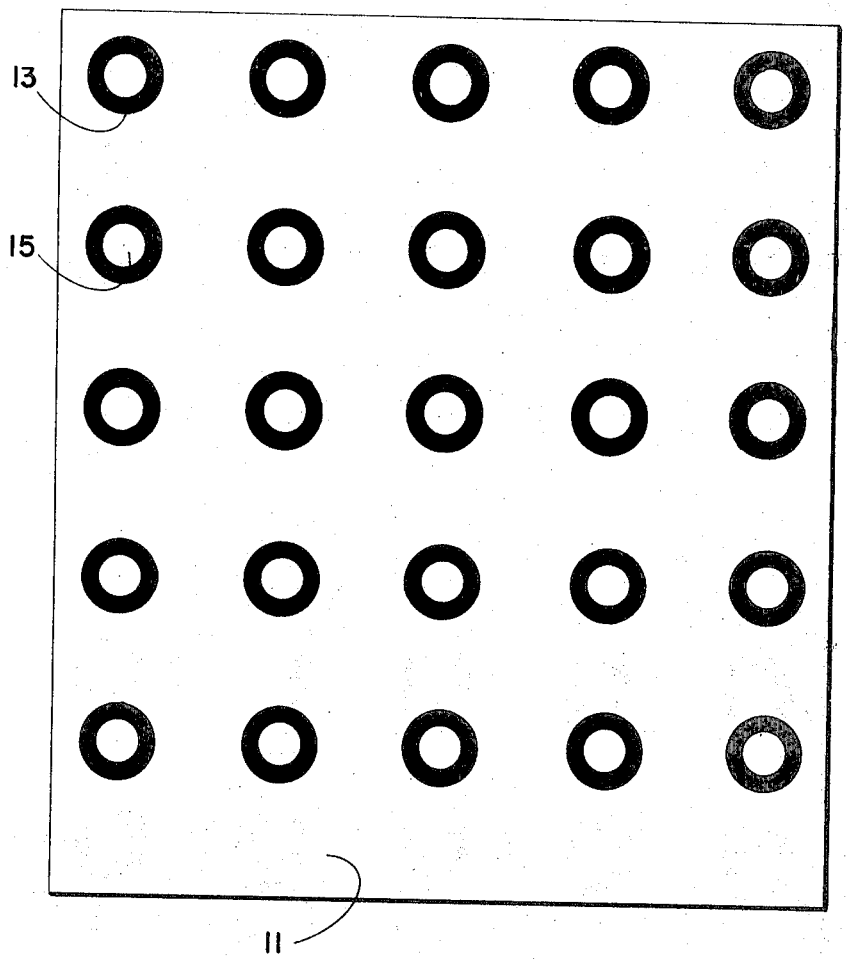

ABSTRACT OF THE DISCLOSURE

A test paper for conducting a plurality of laboratory analytical tests is formed from filter paper bearing a plurality of visible printings which circumscribe predetermined areas on the filter paper for receiving liquid test samples.

BACKGROUND OF THE INVENTION

Heretofore, one of the more conventional techniques for performing a variety of laboratory tests on various liquids has employed the use of absorbent pads or discs. These paper discs are formed from filter paper which is highly absorbent. The discs most commonly used are approximately five-sixteenths of an inch in diameter, although, sometimes slightly smaller or larger. In general the material to be tested is applied to a number of these discs which are then transported to various laboratory areas where a variety of tests can be conducted.

One of the more common tests using absorbent discs is that pertaining to microbiological assays. These assays are performed in order to determine activity of a substance as well as the extent of its activity. For example, antibiotic sensitivity testing is used on clinical isolates to determine the proper antibiotic regimen for the patient. Some of the most widely tested substances are antibiotics and vitamins. A solution of the antibiotic or other substance to be tested is usually placed on a number of absorbent discs which are then placed in contact with an inoculated nutrient. One such nutrient may be agar inoculated with a suitable organism selected for the test. After a predetermined amount of time, a zone may be formed about the disc as a result of a combination of organism growth and diffusion of the test material into the agar. These zones may display inhibition or enhancement of the general growth of the organism on the plate. Provided other parameters are held constant, the size of the zone is a function of the concentration of the active materials in the test solution applied to the sensitivity disc. The measurement of these zones is carried out to fractions of a millimeter and, therefore, the whole testing procedure must be performed with a high degree of care.

Laboratory tests of the above described type generally require the use of a large number of discs to thoroughly test out the characteristics of a test material. Thus, it is not uncommon for as many as fifty or one hundred of these small absorbent discs to be used performing a series of tests. It is apparent that when a laboratory is involved with a great number of test samples as well as a variety of tests for each sample that the use of these pads or discs in a single day will involve several hundred. Thus, the arrangement of these discs for applying test materials and the subsequent transfer of the treated disc to an agar surface inoculated with a suitable organism involves a large amount of manual time. This has even led to the development of mechanical devices for automatically dispensing discs.

SUMMARY OF THE INVENTION

Our invention comprises a test paper for conducting a plurality of laboratory analytical tests in which the sheet, a filter paper, is printed with a plurality of visible printings. Each of these printings which may be in the form of a ring circumscribes a predetermined amount of the filter paper to define a test area that is comparable to that of an absorbent pad or disc. The plurality of printings are of an ink composition that is nontoxic to the various intended test samples and which will also remain fixed in a precise pattern on the filter paper upon making contact with the test sample applied within the area of the printing. It has been established that upon applying such printings to filter paper that the test material which will be of a liquid composition will stay within the boundaries of the circular printing. In other words, there will be no immediate diffusion of the test material and the particular configuration of the printing will cause this test material to assume a similar configuration. Thus, the test paper of our invention provides an extremely efficient means for receiving a plurality of test samples in the precise pattern governed by the printings on the paper. Likewise, the test paper of our invention provides an extremely efficient means for transferring the treated areas to other devices or substances to be used in performing tests or analytical studies on the test material.

It is therefore an object of this invention to provide a new and improved test paper for performing a variety of laboratory tests. Another object of this invention is to provide a test paper that will result in increased efficiency in conducting laboratory tests as well as obtain highly accurate results.

BRIEF DESCRIPTION OF THE DRAWING

The drawing illustrates a top-plan view of a test paper in accordance with this invention.

DESCRIPTION OF THE PREFERRED EMBODIMENT

Referring to the drawing, a test paper 11 is illustrated which has a plurality of visible printings 13 which are in the form of rings. Thus, the illustrated test paper is capable of performing a variety of laboratory, analytical tests through the use of the twenty-five rings in conjunction with several types of test materials. Test paper 11 is formed from conventional filter paper or other type of paper that is readily absorbent with respect to liquids. Rings 13 have been printed on the five and one-half by six inch paper in five rows and five columns in order to easily align them with a multipoint test apparatus of conventional design. In particular such apparatus may have a series of twenty-five probes which are arranged in a pattern corresponding to that of the rings on the paper. The probes can automatically transmit test samples in a single action on all twenty-five of the rings by simply releasing a carefully measured drop of the material onto the central portion 15 of the rings.

Our invention is not limited to any specific shape of filter paper or particular pattern of printing. Thus the filter paper may be circular for use with petri dishes and may also have a circular arrangement of printings 13.

As previously mentioned, in a variety of laboratory tests the zone of interaction between the test material and a nutrient that has been inoculated with a suitable organism is measured to determine the activity of the test material. Thus, it is apparent that the test zone must be uniform throughout a plurality of repeated tests in order that accurate comparisons between test material can be obtained. This uniformity of areas is readily achieved when one is using absorbent pads or discs and it is therefore essential that the central portions 15 of rings 13 perform in a similar manner. It has been discovered that through the use of suitable inks printed on the test paper to circumscribe uniform test areas 15 sample test materials will be maintained in a precisely uniform configuration. The printing material used to define rings 13 is in effect a physical barrier which maintains the test material in a circular configuration which coincides with the central portion 15 in each ring. Diffusion of the test material from the central portions into rings 13 is prevented and thus accurate measurement of the zone of inhibition between test materials and inoculated nutrients can be accurately made.

Test paper made in accordance with our invention may be pre-treated with suitable antibiotics or other test samples prior to being distributed. The form of our paper leads to particular ease for storage and subsequent retrieval for tests. When the treated test paper is used for antimicrobial tests, it may be placed face down, i.e. with the side of the paper bearing the antibiotic, onto the layer of agar prepared on a plate or petri dish. Within a short period of time, the test paper may removed from the agar layer, thereby transferring the antibiotic samples to the agar layer in a pattern corresponding to the pattern of printings 13. If the agar has not yet been inoculated, the overall surface of agar and antibiotic zones may be streaked or coated with the isolate. Thus, our test paper offers a greater freedom of choice as to when the agar can be inoculated.

It is apparent that the material used to print rings 13 on the test paper must be of a nontoxic nature with respect to the test samples to be placed therein. If there is a metallic content in the printing material it is highly probable that such material will be toxic when it comes in contact with the testing material. Consequently, the laboratory test results will be inaccurate. Inasmuch as the paper used for receiving such printings is test paper having absorbent fibers it is also apparent that the material for making the printing must set quickly and not diffuse throughout the paper. If the ink fails to remain fixed upon contact with the test paper the resulting ring will have a fuzzy, irregular perimeter and consequently accurate measurement of the zone of diffusion between the test sample and nutrient will not be possible. Test results would not be accurate since the diffusion of the ink used to print the rings would not always uniformly occur throughout the printed area of the test paper. Furthermore, since rings 13 will come into contact at the edge defining central portions 15 with liquid test material it is important that no diffusion of the ink occur after test material is added. Consequently, in view of the requirements that the ink be nontoxic and will not tend to spread within the texture of the very poorest filter paper it is apparent that not all ordinary printing inks and driers will be satisfactory. We have found that certain types of varnishes will adequately perform with respect to the nontoxic requirement when no drier is used in conjunction with them. However, some alkyd varnishes tend to spread within the texture of the paper and therefore the central portions 15 within rings 13 are not uniformly controlled.

We have found that one preferred printing material used for making rings 13 can comprise 37½% by weight of an alkyd varnish marketed by the Sherwin Williams Company under the name XLG307, 37½% by weight of a varnish marketed by the Resin Solvent and Varnish Company, under the name XLG303, with a 24% by weight of a resin marketed under the trademark Vacseal by Space Environment Laboratories, Inc.

In order to make the rings more visible, a 1% amount of carbon black may be added. Vacseal resin has a volatile solvent so the concentration of this 24% material was reduced to about 60% of the original concentration of the solvent.

The application of the above described alkyd varnish composition to test paper can be done through the use of conventional printing techniques. This ink quickly sets upon being printed on absorbent filter paper and defines central portions 15 with a very well laid out edge. Depending upon the type of test material used, it may be preferable to also print the reverse side of the test paper with an additional set of twenty-five rings which coincides with the printing on the opposite side. The use of such a double printing will fully assure that the ink material impregnates the total thickness of the test paper. Thus, the physical barrier afforded by rings 13 will readily maintain a drop of test material throughout the area of central portion 15 but no further.

To further assure that the ink material will remain fixed on the test paper on the well-defined ring pattern after coming into contact with the test liquid one may wish to first bake the printed material. This can be done with a dry heat at approximately 100° C. for approximately 17 hours. This heating process will further improve the water proofing properties of ink material and will further tend to eliminate any unwanted diffusion of the ink or test material. The test paper is now ready for use with respect to materials to be tested. Beneficial features of such test paper include the easy means of storing the paper for several months prior to use which in effect is the storage of twenty-five absorbent discs or central portions 15 in a fixed pattern without having to first arrange them prior to the introduction testing material. The test material can be easily applied through the use of multipoint apparatus and then with no difficulty transported to other areas for subsequent treatments depending upon the nature of the test to be conducted. However, the stability afforded by this test paper also enables one to store dry treated sheets for use at some future time.

The above-mentioned ink material is particularly suitable for use with aqueous test liquids. Test liquids having a solvent base can be best contained within rings printed from non-toxic materials such as fingernail polish, acrylic co-polymers and waxes such as those marketed by S. C. Johnson & Son under the trademarks "Klear" and "Beautiflor." Thus, it can be seen that there are a number of choices of waxes and resins which can handle non-water solubles and water solubles and are also nontoxic to a series of bacterial and fungal test organisms.

We claim:

1. A test paper for conducting a plurality of laboratory analytical tests of liquid test samples comprising a sheet of absorbent paper, a plurality of visible printings on said paper, each of said printings circumscribing a test area on said paper for receiving a liquid test sample, said printings being of an ink that is non-toxic to said test sample and remains fixed upon contact with a test sample on said test area to provide a physical barrier there against.

2. A test paper in accordance with claim 1 in which the printing impregnates the total thickness of said paper.

3. A test paper in accordance with claim 2 in which a second plurality of like visible printings coincide with said first printings on the opposite side of the test paper.

4. A test paper in accordance with claim 3 in which said printings are in the form of rings.

5. A test paper in accordance with claim 4 in which said printings are in a symmetrical pattern of arrangement.

6. A test paper in accordance with claim 5 in which said printings are in a symmetrical pattern of columns and rows.

7. A test paper in accordance with claim 6 in which each of said printings is defined by a sharp edge.

References Cited

UNITED STATES PATENTS

| | | | |
|---|---|---|---|
| 3,245,882 | 4/1966 | Guthrie | 23—230 B |
| 3,699,003 | 10/1972 | Kronish et al. | 23—253 TP |

JOSEPH SCOVRONEK, Primary Examiner

D. LOVERCHECK, Assistant Examiner

U.S. Cl. X.R.

23—253 TP, 230 B; 117—14, 15, 38, 68; 195—103.5 R